US009845781B2

(12) United States Patent
Marthaler et al.

(10) Patent No.: US 9,845,781 B2
(45) Date of Patent: Dec. 19, 2017

(54) ENGINE ACCESSORY DRIVE SYSTEM

(71) Applicant: Cummins Inc., Columbus, IN (US)

(72) Inventors: Michael J. Marthaler, Columbus, IN (US); Jeffrey W. Rinker, Trafalgar, IN (US)

(73) Assignee: Cummins Inc., Columbus, IN (US)

( * ) Notice: Subject to any disclaimer, the term of this patent is extended or adjusted under 35 U.S.C. 154(b) by 391 days.

(21) Appl. No.: 14/640,283

(22) Filed: Mar. 6, 2015

(65) Prior Publication Data

US 2016/0258409 A1 Sep. 8, 2016

(51) Int. Cl.

| | |
|---|---|
| ***B60K 1/00*** | (2006.01) |
| ***B60W 20/00*** | (2016.01) |
| ***F02N 11/00*** | (2006.01) |
| ***F02N 11/04*** | (2006.01) |
| ***F02N 15/08*** | (2006.01) |
| *F02N 11/08* | (2006.01) |
| *F02N 15/02* | (2006.01) |
| *F02N 15/04* | (2006.01) |
| *F02N 15/06* | (2006.01) |

(52) U.S. Cl.

CPC ............ *F02N 11/003* (2013.01); *F02N 11/04* (2013.01); *F02N 15/08* (2013.01); *F02N 11/0814* (2013.01); *F02N 15/022* (2013.01); *F02N 15/043* (2013.01); *F02N 15/06* (2013.01)

(58) Field of Classification Search

CPC .................................. B60K 1/00; B60W 2/00

See application file for complete search history.

(56) References Cited

U.S. PATENT DOCUMENTS

| | | | | |
|---|---|---|---|---|
| 6,251,042 | B1 | 6/2001 | Peterson et al. | |
| 6,598,496 | B2 | 7/2003 | Pannell | |
| 7,547,264 | B2 | 6/2009 | Usoro | |
| 7,552,705 | B2 | 6/2009 | Serkh et al. | |
| 7,582,034 | B2 | 9/2009 | Usoro | |
| 7,600,381 | B2 | 10/2009 | Verbrugge et al. | |
| 8,166,945 | B2 | 5/2012 | Spicer et al. | |
| 8,216,113 | B2 | 7/2012 | Parsons | |
| 2001/0042647 | A1* | 11/2001 | Sakamoto .............. | B60K 6/442 180/65.23 |
| 2013/0297161 | A1* | 11/2013 | Gibson ................ | B60W 20/00 701/54 |

FOREIGN PATENT DOCUMENTS

| | | |
|---|---|---|
| EP | 0 916 546 | 8/2005 |

* cited by examiner

*Primary Examiner* — Bryan Evans
(74) *Attorney, Agent, or Firm* — Foley & Lardner LLP

(57) ABSTRACT

An engine accessory drive (EAD) system for an engine includes a motor-generator (MGU) unit operably coupled to an accessory. The EAD system also includes a gearbox assembly, which includes a first gear train operably coupled to the MGU, and a second gear train operably coupled to an output of the engine. The gearbox assembly also includes a clutch selectively coupling the first gear train with a second gear train. The EAD system further includes a starter assembly, which includes a starter shaft operably coupled to the second gear train. The starter assembly also includes a starter pinion coupled to the starter shaft, and an actuator configured to selectively engage the starter pinion with a flywheel of the engine. Further yet, the EAD system includes an EAD controller configured to selectively operate the EAD system in one of a generator mode, an accessory drive mode, and a starter mode.

22 Claims, 11 Drawing Sheets

ENGINE ACCESSORY DRIVE SYSTEM

TECHNICAL FIELD

The present disclosure relates generally to the field of internal combustion engine systems. More particularly, the present disclosure relates to engine accessory drive systems for internal combustion engines.

BACKGROUND

Automotive manufacturers have developed various technologies to improve fuel economy and reduce emissions in response to consumer demand and government regulations. For example, start-stop systems operate to automatically shut down and restart a vehicle's internal combustion engine to reduce the amount of time that the engine spends idling, thereby reducing fuel consumption and emissions. This is most advantageous for vehicles that spend significant amounts of time waiting at traffic lights or that frequently come to a stop while driving. Fuel economy gains from this technology are typically in the range of five to fifteen percent or more.

Vehicle start-stop systems provide various design challenges. For example, conventional starter motors are not designed for the number of operational cycles required for start-stop systems compared to conventional systems. For example, starter motors in conventional non-start-stop systems are designed to perform at least 50,000 starting cycles over a vehicle's lifetime. In contrast, starter motors in start-stop systems are designed to perform as many as 500,000-800,000 cycles over a vehicle's lifetime. Accordingly, many conventional starter motors are inadequate for the demands of start-stop systems.

In addition, vehicle accessories, such as an alternator, power steering pump, coolant pump, vacuum pump, air conditioning compressor, fan, etc., are typically driven by the crankshaft of the engine via an accessory drive (e.g., serpentine) belt. However, in start-stop systems, the accessories are not driven by the engine when the engine is shut down.

SUMMARY

Various embodiments relate to engine accessory drive (EAD) systems for internal combustion engines. An example EAD system includes a motor-generator unit (MGU) operably coupled to an accessory. The EAD system also includes a gearbox assembly. The gearbox assembly includes a first gear train operably coupled to the MGU. The gearbox assembly also includes a second gear train operably coupled to an output of the engine, as well as a clutch selectively coupling the first gear train with a second gear train. A starter assembly includes a starter shaft operably coupled to the second gear train. The starter assembly also includes a starter pinion coupled to the starter shaft. The starter assembly further includes an actuator configured to selectively engage the starter pinion with a flywheel of the engine. An EAD controller is configured to selectively operate the EAD system in one of a generator mode, an accessory drive mode, and a starter mode.

Another example EAD system includes an MGU configured to selectively operate as an electric generator and an electric motor. The MGU is operably coupled to an energy storage system. A gearbox assembly is operably coupled to the MGU and to an output of the engine. An EAD controller is in operative communication with each of the MGU and the gearbox assembly. The EAD controller is structured to receive engine data indicative of an engine condition, and to receive state of charge data indicative of a state of charge of the energy storage system. The EAD system is also structured to interpret each of the engine data and the state of charge data, and to selectively operate the EAD system in one of a generator mode and an accessory drive mode.

Various other embodiments relate to a method, including providing an EAD controller that is operably coupled to each of an internal combustion engine and an EAD system. The EAD system includes an MGU configured to selectively operate as an electric generator and an electric motor. The EAD system also includes an energy storage system operably coupled to the MGU. The EAD system further includes a gearbox assembly operably coupled to the MGU and to an output of the engine. The method also includes receiving, by the EAD controller, engine data indicative of an engine condition, and state of charge data indicative of a state of charge of the energy storage system. The method further includes interpreting, by the EAD controller, each of the engine data and the state of charge data. The method further includes selectively operating, by the EAD controller, the EAD system in one of a generator mode and an accessory drive mode.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1A:
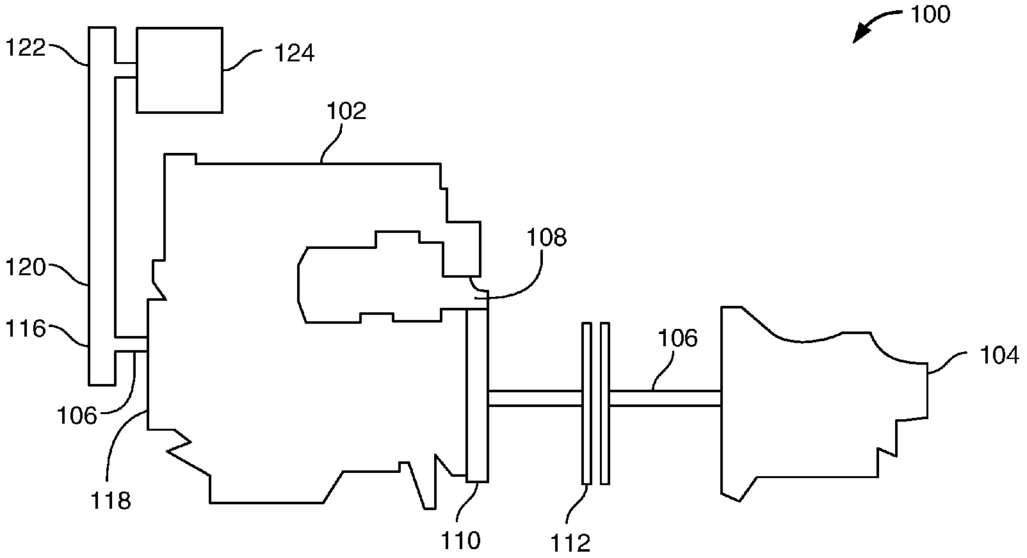
FIGS. 1A-1C illustrate several example conventional vehicle powertrain systems.

FIG. 1A is a side view of a conventional vehicle powertrain system 100. In general, the vehicle powertrain system 100 includes an engine 102 operably connected to a transmission 104 via a crankshaft 106. A starter motor 108 is mounted to the engine 102, and includes a drive pinion that, in operation (e.g., by activating a key-operated switch), meshes with a ring gear on a flywheel 110 of the engine 102. The drive pinion on the starter motor 108 rotates the flywheel 110 so as to initiate the engine's 102 operation. During operation, the flywheel 110 operates to store angular momentum between combustion events within the engine 102. A clutch 112 operates to selectively couple the engine 102 and the transmission 104.

A crankshaft pulley 116 is coupled to the crankshaft 106 on a front side 118 of the engine 102. A belt 120 is coupled to the crankshaft pulley 116 and to one or more accessories. For example, as illustrated in FIG. 1A, the belt 120 is coupled to an accessory pulley 122 of an alternator 124 to drive the alternator 124. The alternator 124 is configured to convert mechanical energy received via the belt 120 to electrical energy. The electrical energy may be transferred to a battery (not shown) to power the electrical system of the vehicle. According to various configurations, the powertrain system 100 may include several accessories in addition to the alternator 124, such as a power steering pump, coolant pump, vacuum pump, air conditioning compressor, fan, etc. The crankshaft pulley 116, the belt 120, and the accessory pulley 122 may be collectively referred to as a "front engine accessory drive" (FEAD) because they are located on the front side 118 of the engine 102, and they operate to drive the accessories, such as the alternator 124.

Figure 1B:
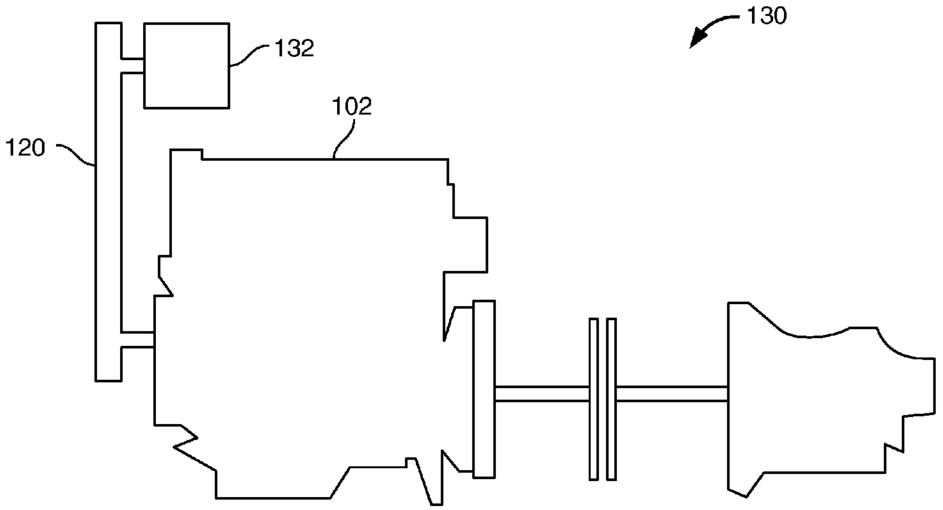

FIG. 1B is a side view of another example vehicle powertrain system 130. The vehicle powertrain system 130 of FIG. 1B is similar to the system 100 of FIG. 1A, except that the system 130 includes a belt-driven integrated starter-generator (ISG) 132 (also referred to as a "belted alternator starter") instead of the discrete starter motor 108 and the alternator 124. The ISG 132 performs the functions of both the starter motor 108 and the alternator 124, namely, starting the engine 102 and generating power for the electrical system. In addition, the ISG 132 may be configured to convert the vehicle's kinetic energy into electrical energy through regenerative braking.

The system 130 of FIG. 1B may utilize the ISG 132 in conjunction with a start-stop system. For example, an electronic control system (not shown) can shut down the engine 102 when the engine 102 is at zero load (e.g., when standing at a traffic light), and automatically restart the engine 102 via the ISG 132 when the accelerator pedal is pressed. In some implementations, the system 130 may include a separate starter motor in addition to the ISG 132. The starter motor may be used to start the engine 102 from a cold start, and the ISG 132 may be used to restart the engine 102 during start-stop operation.

Starting the engine by the ISG 132 requires a significant amount of torque output from the ISG 132. Accordingly, the belt 120 of the system 130 of FIG. 1B must be tensioned to a higher belt tension than the belt 120 of the system 100 of FIG. 1A. Therefore, the belt 120 of the system 130 of FIG. 1B must be stronger than the belt 120 of the system 100 of FIG. 1A. Furthermore, due to the higher belt tension of the belt 120, the bearings and mounting hardware of the ISG 132 and any additional accessories must be stronger than those of the alternator 124 and accessories of FIG. 1A.

Figure 1C:
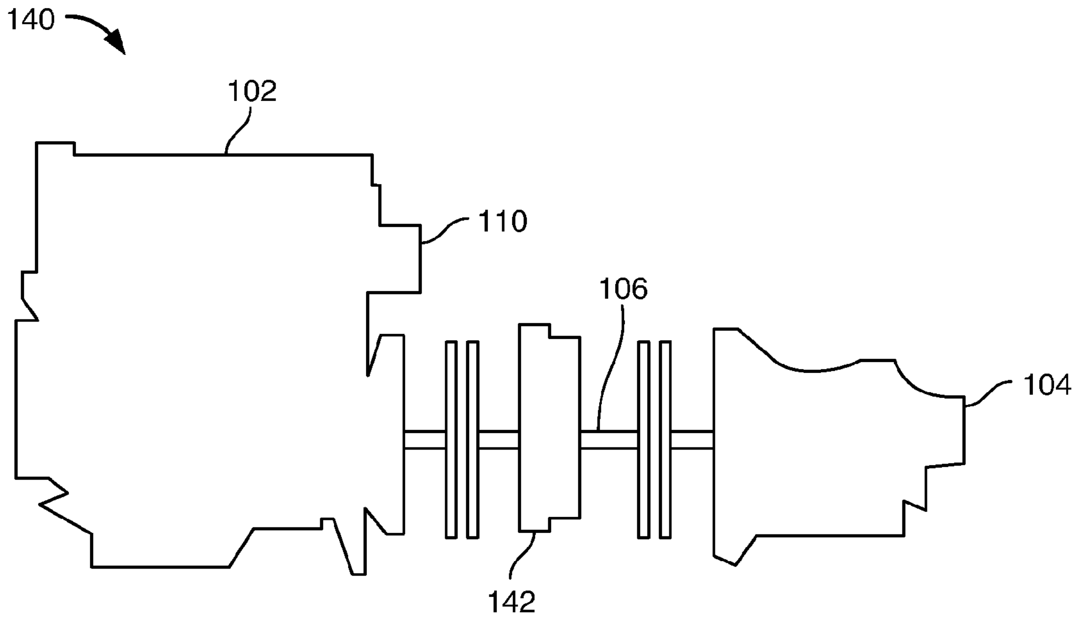

FIG. 1C is a side view of still another vehicle powertrain system 140. The system 140 of FIG. 1C includes a crankshaft-mounted ISG 142 coupled to the rear side 110 of the engine 102, between the engine 102 and the transmission 104. Similar to the ISG 132 of FIG. 1B, the ISG 142 performs the functions of both the starter motor 108 and the alternator 124, namely, starting the engine 102 and generating power for the electrical system. Because the ISG 142 is coupled directly to the crankshaft 106 without the use of the belt 120, the system 140 avoids the design challenges of the system 130 of FIG. 1B related to torque and tension requirements.

The present disclosure is directed to an engine accessory drive (EAD) system for use with an internal combustion engine. The EAD system includes an electric motor-generator unit (MGU) configured to selectively operate as an electric motor and an electric generator. In an embodiment, the MGU includes a single input/output shaft operably coupled to each of an engine accessory and a gearbox assembly. The gearbox assembly may be operatively coupled to an engine output (e.g., crankshaft). The gearbox assembly includes multiple gear trains that may be selectively engaged depending on a selected operational mode. The gear trains may have different gear ratios. Unlike conventional gearboxes that typically have relatively close gear ratios (e.g., 1.5:1, 2:1, etc.), the gear trains of the gearbox assembly may have relatively wide gear ratios (e.g., 14.5:1 for a first gear trains and 3:1 for a second gear trains in one embodiment).

The EAD system is selectively operable in at least two operational modes, including a generator mode and an accessory drive mode. In some embodiments, the EAD system is also operable in a starter mode. In the generator mode, mechanical energy (e.g., torque) is transferred from the engine to the MGU through the gearbox assembly, and the MGU is configured to convert the mechanical energy to electrical energy, which may be stored in a battery system. In the accessory drive mode, the MGU is configured to convert electrical energy to mechanical energy to operate the engine accessories. In the starter mode, the MGU is configured to convert electrical energy to mechanical energy to operate a starter mechanism.

The EAD system of the present disclosure provides an integrated system that may replace several discrete components utilized in conventional engine systems. In particular, the MGU of the EAD system may function as each of an electrical generator, an electric accessory drive motor, and an electric starter motor. For example, the EAD system may be utilized in start-stop systems to automatically shut down and restart a vehicle's internal combustion engine to reduce the amount of time that the engine spends idling, thereby reducing fuel consumption and emissions. When the engine is shut down, the MGU may operate as an electric motor to operate engine accessories. In conventional start-stop systems, accessories are either non-operational when the engine is shut down, or the accessories are driven using one or more electric motors. The EAD system of the present disclosure provides an integrated system in which the MGU may operate accessories while the engine is shut down, may operate as a starter to start and restart the engine, and may also operate as a generator to charge the battery system. In addition, while the engine is in operation and the battery system has a sufficient state of charge, the MGU of the EAD system may power the accessories rather than the engine powering the accessories. Accordingly, the EAD system of the present disclosure results in reduced part count, weight, size, and cost, while also providing improved engine performance and reduced fuel consumption, compared to conventional systems.

Figure 2:
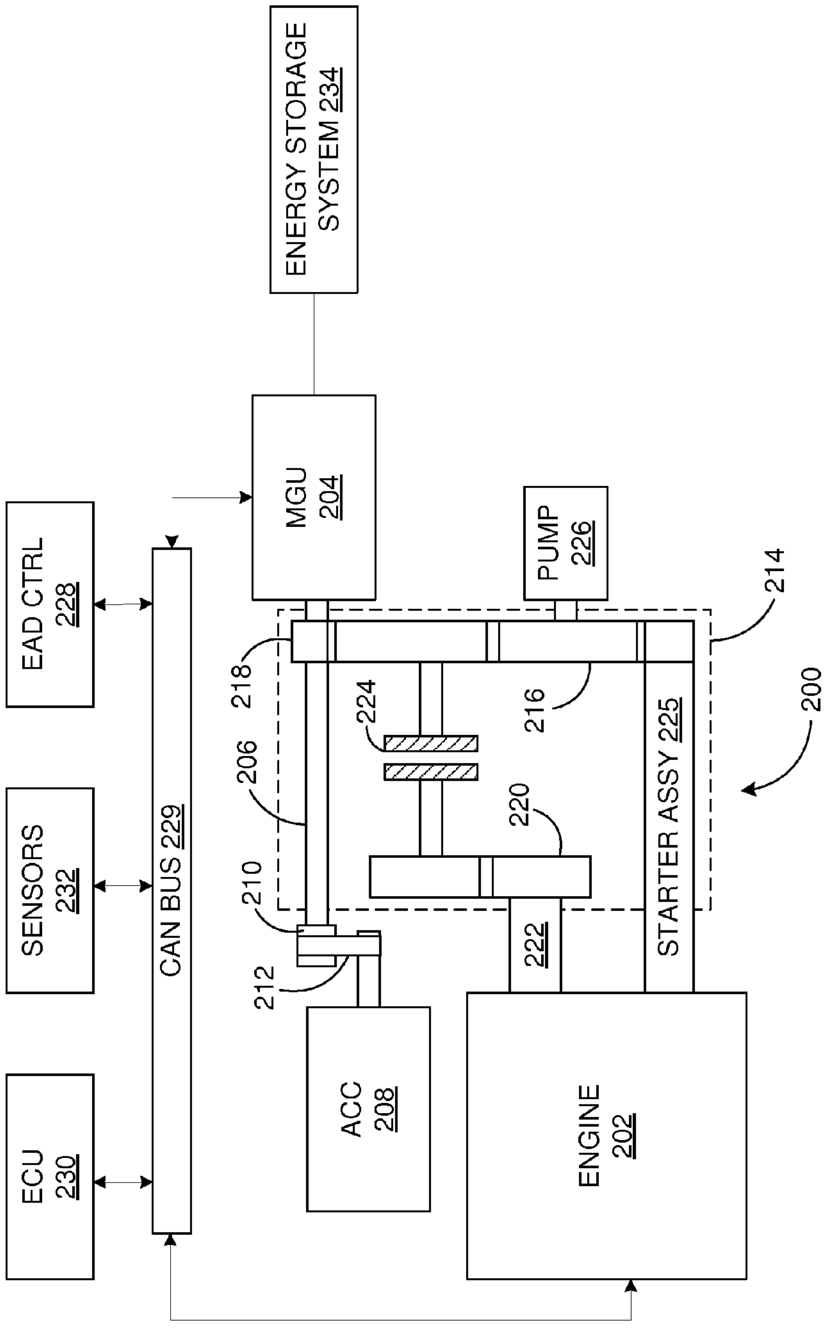
FIG. 2 is a schematic diagram of an EAD system for use with an engine, according to an embodiment.

FIG. 2 is a schematic diagram of an EAD system 200 for use with an engine 202, according to an embodiment. The engine 202 may be an internal combustion engine, such as a compression-ignition (e.g., diesel-powered) engine or a spark-ignition (e.g., gasoline-powered) engine. The engine may be utilized to power a vehicle, a generator set, or may be used in other applications. As illustrated in FIG. 2, the EAD system 200 includes an MGU 204 having an input/output shaft 206. The MGU 204 is operatively coupled, via the input/output shaft 206, to an accessory 208. For example, in an embodiment, a pulley 210 is coupled to a distal end of the input/output shaft 206. The pulley 210 is configured to drive a belt 212, which is operatively coupled to the accessory 208. In some embodiments, the belt 212 may be coupled to multiple accessories 208. In other embodiments, the input/output shaft 206 may operatively couple the MGU 204 and the accessory 208 using other coupling methods, such as gears, for example.

The MGU 204 is also operatively coupled, via the input/output shaft 206 to a gearbox assembly 214. The gearbox assembly 214 may include one or more gear trains or gear sets. The gear trains may have one or more fixed or variable gear ratios. As illustrated in FIG. 2, the gearbox assembly 214 includes a first gear train 216 operably coupled to the MGU 204 via a pinion gear 218 coupled to the input/output shaft 206. The gearbox assembly 214 also includes a second gear train 220 operably coupled to an output 222 (e.g., crankshaft) of the engine 202. In some embodiments, the second gear train 220 is coupled directly to the output 222. However, in other embodiments, the second gear train 220 is indirectly coupled to the output 222. For example, the second gear train 220 may be operably coupled to a camshaft or power take-off shaft, which is driven by the crankshaft, thereby indirectly coupling the second gear train 220 to the output 222. The first gear train 216 is selectively coupled to the second gear train 220 via a clutch 224. The first gear train 216 is also operably coupled to each of a starter assembly 225 and a hydraulic pump 226.

The EAD system 200 also includes an EAD controller 228. The EAD controller 228 is structured to operatively communicate with the MGU 204 and as well as other various components. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus 229 provides the exchange of signals, information, and/or data. The CAN bus 229 includes any number of wired and wireless connections. For example, the EAD controller 228 may be structured to operatively communicate with at least one of an engine control unit (ECU) 230 and various sensors 232 (e.g., speed sensors, torque sensors, voltage and current sensors, etc.) via the CAN bus 229. The ECU 230 and the sensors 232 are configured to provide any of several different measurement values (e.g., speed, torque, state of charge, etc.). The EAD controller 228 is structured to interpret the measurement values and to control the EAD system 200 based on such interpretations.

The EAD controller 228 may be configured to operate the EAD system 200 in various operational modes, including a generator mode, an accessory drive mode, and a starter mode. In the generator mode, the clutch 224 is engaged such that mechanical energy (e.g., torque) is transferred from the engine output 222 to the MGU 204 through the gearbox assembly 214. In this operational mode, the MGU 204 is configured to convert the mechanical energy to electrical energy, which may be stored in an energy storage system 234 and used, for example, to operate an electrical system. In other words, the MGU 204 is configured to operate as an electrical generator (e.g., alternator) in the generator mode. The energy storage system 234 may include one or more batteries. In some embodiments, the energy storage system 234 may also include a battery control module. In the generator mode, the accessories 208 are driven using mechanical energy transferred from the engine output 222 to the accessories 208 through the gearbox assembly 214.

In the accessory drive mode, the clutch 224 is disengaged to decouple the engine output 222 from the MGU 204. The MGU 204 is configured to convert electrical energy (e.g., stored in the energy storage system 234) to mechanical energy to operate the engine accessories 208. In other words, the MGU 204 is configured to operate as an electric motor in the accessory drive mode. Mechanical energy (e.g., torque) is transferred from the MGU to the accessories 208 via the input/output shaft 206, as described above.

In the starter mode, the clutch 224 is disengaged to decouple the engine output 222 from the MGU 204. The MGU 204 is configured to convert electrical energy (e.g., stored in the energy storage system 234) to mechanical energy to operate the starter assembly 225. The starter assembly 225 includes a drive shaft operably coupled to the first gear train 216 at a first end and a sliding pinion gear at a second end. The sliding pinion gear may be engaged with the flywheel (not shown) of the engine 202 such that the mechanical energy from the MGU 204 is used to start the engine 202. Accordingly, the EAD system 200 eliminates the need for a conventional starter motor.

Figure 3:
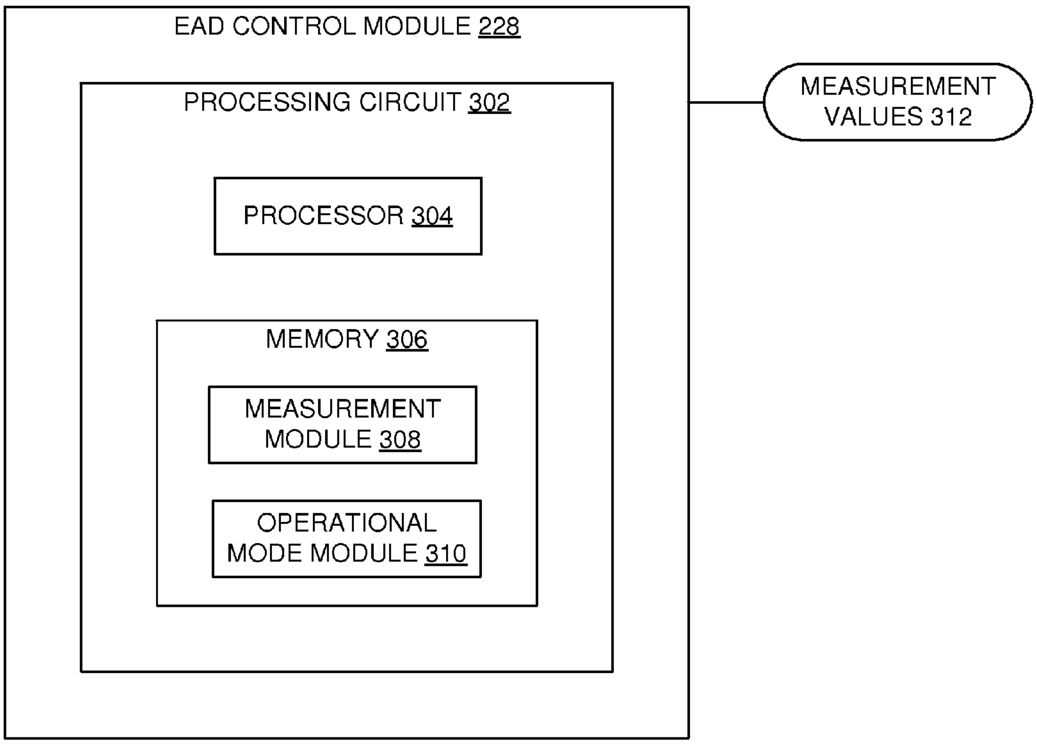
FIG. 3 is a block diagram of the EAD controller of FIG. 2, according to a particular embodiment.

FIG. 3 is a block diagram of the EAD controller 228 of FIG. 2, according to an embodiment. As illustrated in FIG. 3, the EAD controller 228 includes a processing circuit 302 including a processor 304 and a memory 306. The processor 304 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 306 (e.g., RAM, ROM, Flash Memory, hard disk storage, etc.) may store data and/or computer code for facilitating the various processes described herein. Thus, the one or more memory devices 306 may be communicably connected to the processor 304 and provide computer code or instructions to the processor 304 for executing the processes described in regard to the EAD controller 228 herein. Moreover, the one or more memory devices 306 may be or include tangible, non-transient volatile memory or non-volatile memory. Accordingly, the one or more memory devices 306 may include database components, object code components, script components, or any other type of information structure for supporting the various activities and information structures described herein.

The memory 306 is shown to include various modules for completing the activities described herein. More particularly, the memory 306 includes modules structured to optimize control of the EAD system 200 of FIG. 2. While various modules with particular functionality are shown in FIG. 2, it should be understood that the EAD controller 228 and memory 306 may include any number of modules for completing the functions described herein. For example, the activities of multiple modules may be combined as a single module, additional modules with additional functionality may be included, etc. Further, it should be understood that the EAD controller 228 may further control other vehicle activity beyond the scope of the present disclosure.

Certain operations of the EAD controller 228 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As illustrated in FIG. 3, the EAD controller 228 includes a measurement module 308 and an operational mode module 310. The measurement module 308 is in operative communication with the ECU 230 and various sensors 232 (FIG. 2). The measurement module 308 is configured to receive measurement values 312 from the ECU 230 and/or the sensors 232, and to interpret measurement values based on the received measurement values 312. The sensors 232 may include any of various types of sensors configured to measure characteristics related to the engine and/or related systems. For example, the sensors 232 may include an engine speed sensor, an engine torque sensor, an oxygen sensor, a fuel sensor (e.g., a fuel injection monitor), an engine temperature sensor (e.g., on the block of the engine, near the exhaust valve of the engine to monitor an exhaust gas temperature, and any other location), a current and voltage sensor, etc. Accordingly, the measurement values 312 may include, but is not limited to, an engine speed (revolutions-per-minute (RPM)), an engine output power, an engine temperature, a state of the engine (e.g., ON or OFF), an engine load, a state of charge of the energy storage system and/or any other engine or vehicle characteristics.

The operational mode module 310 is configured to control operation of the EAD system 200 based on the interpreted measurement values 312. For example, the operational mode module 310 may change operation of the EAD system 200 from one of the generator mode, the accessory drive mode, and the starter mode to another of the generator mode, the accessory drive mode, and the starter mode based on the interpreted measurement values 312. In one embodiment, for example, the measurement values 312 may include a state of charge of the energy storage system 234. The operational mode module 310 may be configured to change operation of the EAD system 200 from the accessory drive mode to the starter mode when the state of charge value falls below a predetermined value. The operational mode module may also change operation of the EAD system 200 from the starter mode to the generator mode upon detecting that the engine has started.

In another example, according to an embodiment, the measurement values 312 may include an accessory load demand value and a state of charge value. The measurement module 308 may determine an MGU output capacity based on the state of charge value. The operational mode module 310 may change operation of the EAD system 200 from the accessory drive mode to the starter mode when the accessory load demand value exceeds the MGU output capacity. The operational mode module may also change operation of the EAD system from the starter mode to the generator mode upon detecting that the engine has started.

Figure 4A:
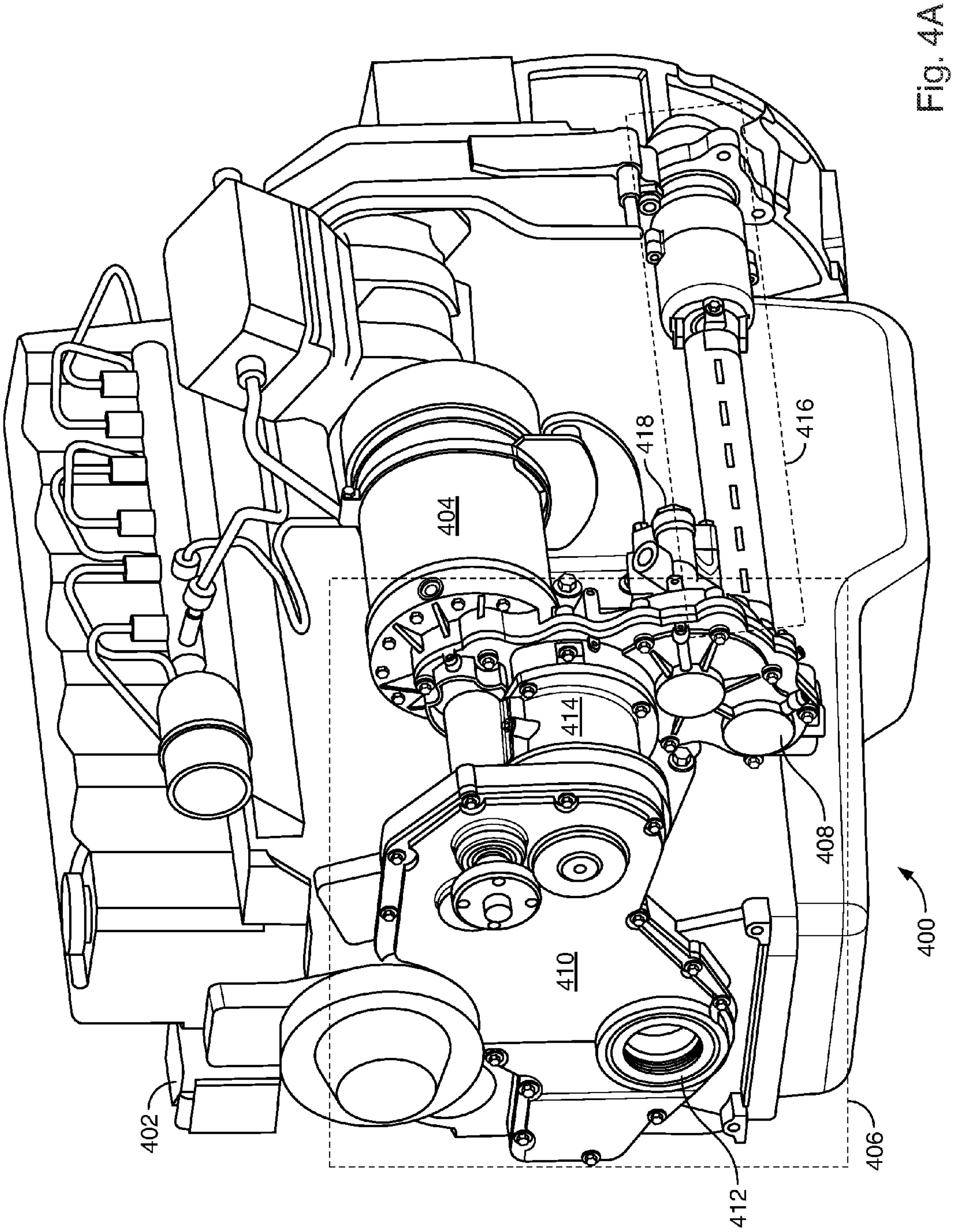
FIGS. 4A-4D are several perspective views of an EAD system operably coupled to an engine, according to an embodiment.

FIG. 4A is a perspective view of an EAD system 400 operably coupled to an engine 402, according to an embodiment. In general, the EAD system 400 includes an MGU 404 mounted to a side of the engine 402. According to various embodiments, the MGU 404 is an electric machine that is capable of selectively operating as an electric motor or electrical generator (e.g., alternator). The EAD system 400 also includes a gearbox assembly 406. In general, the gearbox assembly 406 includes a first gear train 408 operably coupled to the MGU 404 and a second gear train 410 operably coupled to an output 412 (e.g., crankshaft) of the engine 402. The first gear train 408 is selectively coupled to the second gear train 410 via a clutch 414.

The EAD system 400 also includes a starter assembly 416 and a hydraulic pump 418, each of which being operably coupled to the first gear train 408. As discussed in further detail below, the starter assembly 416 is powered by the MGU 404 via the first gear train 408. In contrast, conventional engine systems typically include electric starter motors. Because the EAD system 400 utilizes the MGU 404 to power the starter assembly 416, the EAD system 400 eliminates the need for a separate starter motor.

Figure 4B:
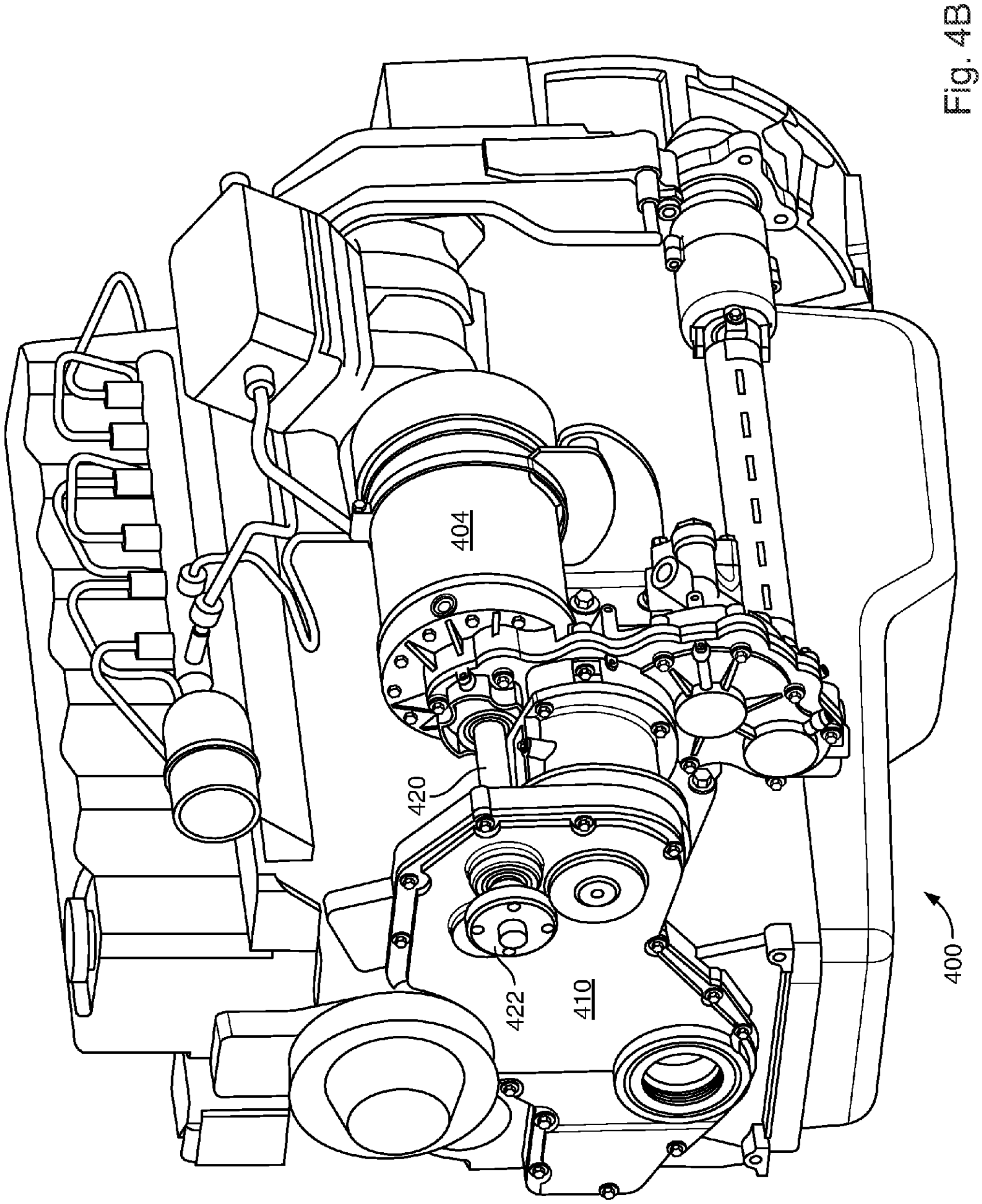

FIG. 4B is another perspective view of the EAD system 400 of FIG. 4A, with a cover removed to illustrate an accessory drive shaft 420 of the MGU 404. The accessory drive shaft 420 extends through the second gear train 410. An accessory drive hub 422 is coupled to a distal end of the accessory drive shaft 420. The accessory drive hub 422 may be a pulley configured to drive an accessory drive belt (not shown) so as to operate one or more engine accessories.

Figure 4C:
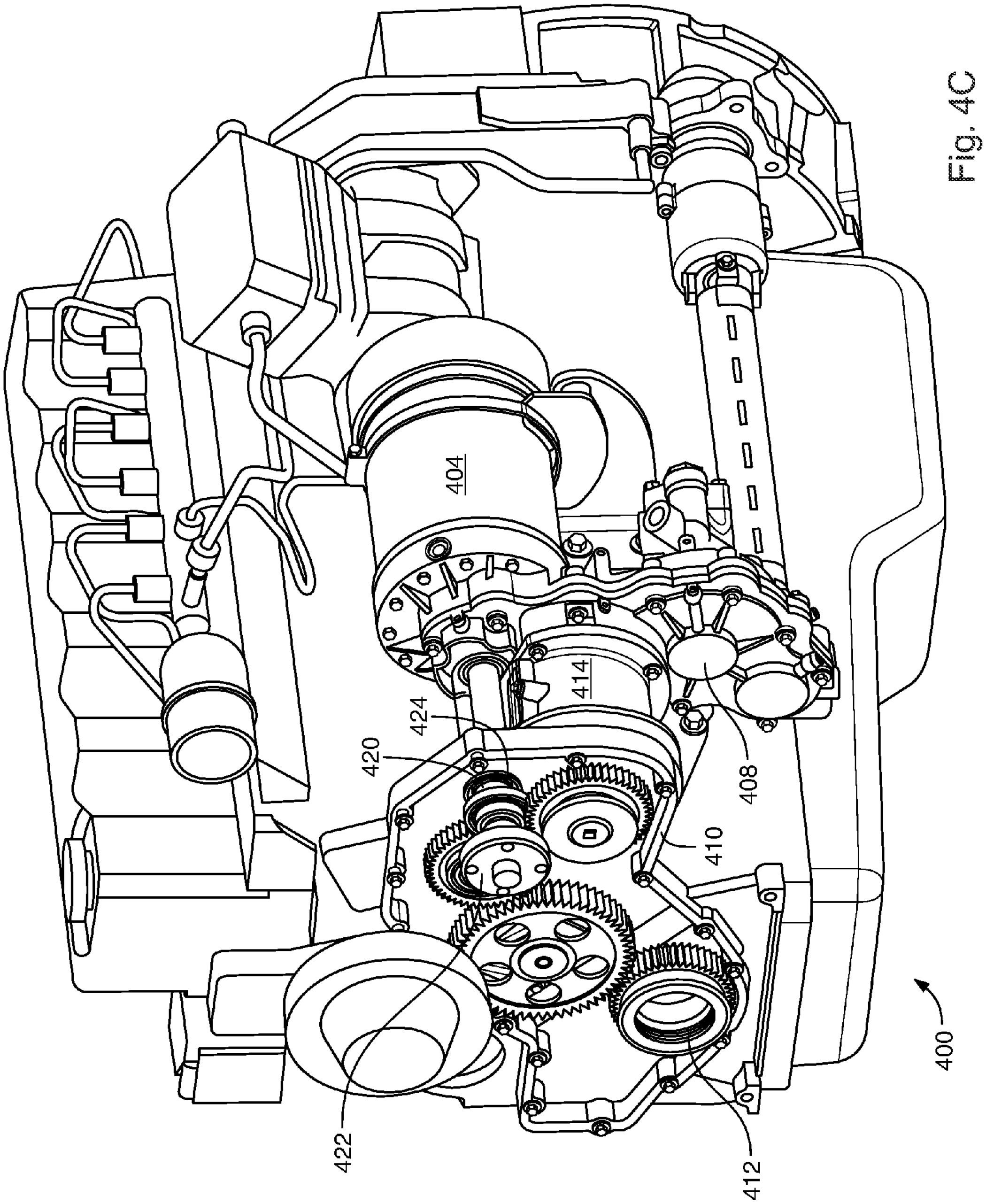

FIG. 4C is another perspective view of the EAD system 400 of FIGS. 4A and 4B, with a cover removed from the second gear train 410 to illustrate the configuration of the second gear train 410, according to an embodiment. As illustrated in FIG. 4C, the second gear train 410 includes several gears operably coupled to the engine output 412 so as to transfer torque from the engine output 412, through the second gear train 410 and the clutch 414, and to the first gear train 408. The second gear train 410 may utilize various gear ratios, depending on application requirements. In some embodiments, the second gear train 410 is permanently meshed with the engine output 412. In other embodiments, however, the second gear train 410 includes an engagement mechanism (e.g., a clutch) to selectively decouple the second gear train 410 and the engine output 412.

As shown in FIG. 4C, the accessory drive shaft 420 extends through the second gear train 410 and is supported by a bearing 424. In some embodiments, the accessory drive shaft 420 is not engaged with the gears of the second gear train 410. Instead, torque is transferred from the crankshaft to the MGU 404 through the second gear train 410, the clutch 414, and the first gear train 408. In other embodiments, however, the accessory drive shaft 420 is engaged with the gears of the second gear train 410.

Figure 4D:
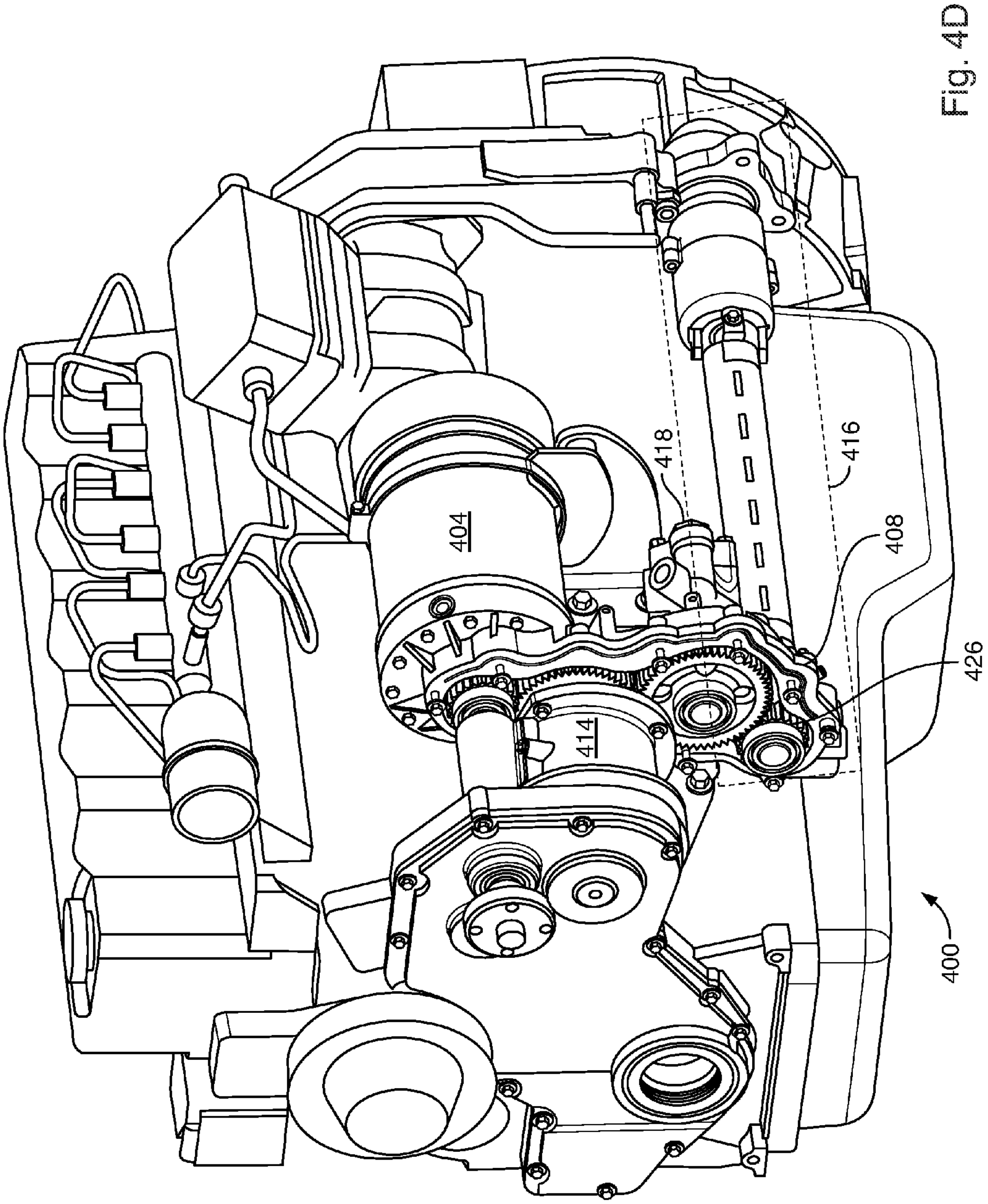

FIG. 4D is another perspective view of the of the EAD system 400 of FIGS. 2A-2C, with a cover removed from the first gear train 408 to illustrate the configuration of the first gear train 408, according to an embodiment. As illustrated in FIG. 4C, the first gear train 408 includes several gears operably coupled to each of the MGU 404, the clutch 414, the hydraulic pump 418, and the starter assembly 416. The first gear train 408 may utilize various gear ratios, depending on application requirements. In one embodiment, the first gear train 408 utilizes a gear ratio of 0.5:1 (e.g., low speed) to drive the hydraulic pump 418, and a gear ratio of 1:1 (e.g., high speed) to drive the starter drive shaft 426 of the starter assembly 416. In some embodiments, the starter drive shaft 426 is permanently engaged with the first gear train 408. In other embodiments, however, the first gear train 408 includes an engagement mechanism (e.g., a clutch) to selectively decouple the starter drive shaft 426 from the first gear train 408. The starter assembly 416 may include a sliding pinion gear configured to engage a flywheel of the engine (not shown). When the pinion gear of the starter assembly 416 is engaged with the flywheel, the gear ratio between the MGU 404 and the flywheel is 14.5:1, according to one embodiment. In other embodiments, the gear ratio is at least 10:1. Accordingly, in some embodiments, the EAD system 400 is configured to employ relatively wide gear ratios, selectively and/or concurrently.

Figure 5A:
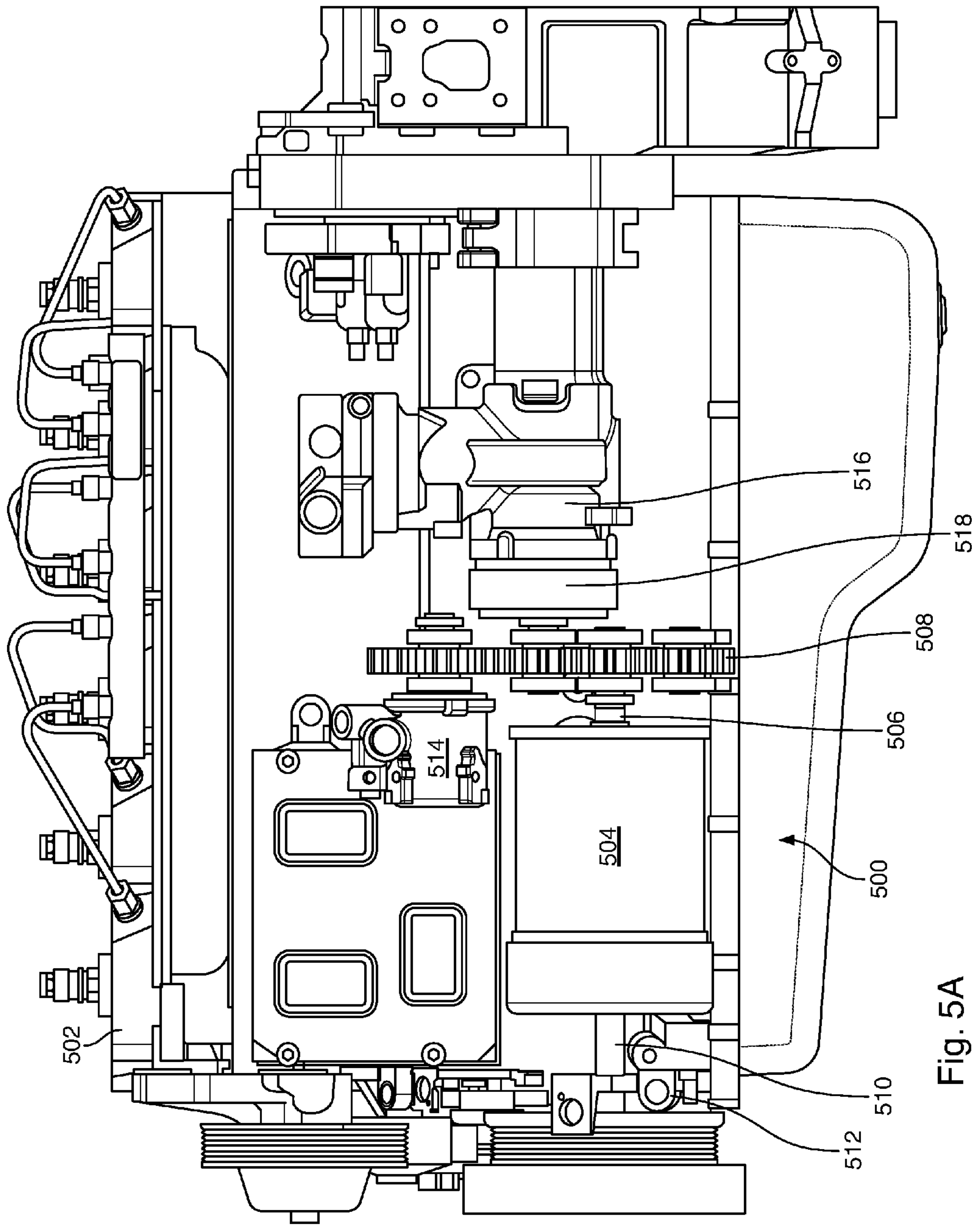
FIGS. 5A-5B illustrate an EAD system operably coupled to an engine, according to another embodiment.

FIG. 5A illustrates an EAD system 500 operably coupled to an engine 502, according to another embodiment. Similar to the EAD system 400 of FIGS. 4A-4D, the EAD system 500 of FIG. 5A includes an MGU 504 capable of selectively operating as an electric motor or an electric generator. The MGU 504 includes a first input/output shaft 506 operably coupled to a first gear train 508, and a second output shaft 510 operably coupled to a second gear train 512. The EAD system 500 also includes a hydraulic pump 514 operably coupled to the first gear train 508, and an air compressor 516 selectively coupled to the first gear train 508 via a clutch 518.

In some embodiments, engine accessories are powered by torque transferred thereto from the MGU 504 via the second gear train 512. In some embodiments, the second gear train 512 is not coupled to an output of the engine 502 and the accessories are operable only via the MGU 504. However, in other embodiments, the second gear train 512 is coupled to an output of the engine 502 and the accessories are selectively operable via the output of the engine 502. The first gear train 508 is configured to receive torque transferred thereto from at least one of the MGU 504 and an output of the engine 502 either directly (e.g., via the crankshaft) or indirectly (e.g., via the camshaft). Such torque may be used to power the hydraulic pump 514 and/or the air compressor 516.

Figure 5B:
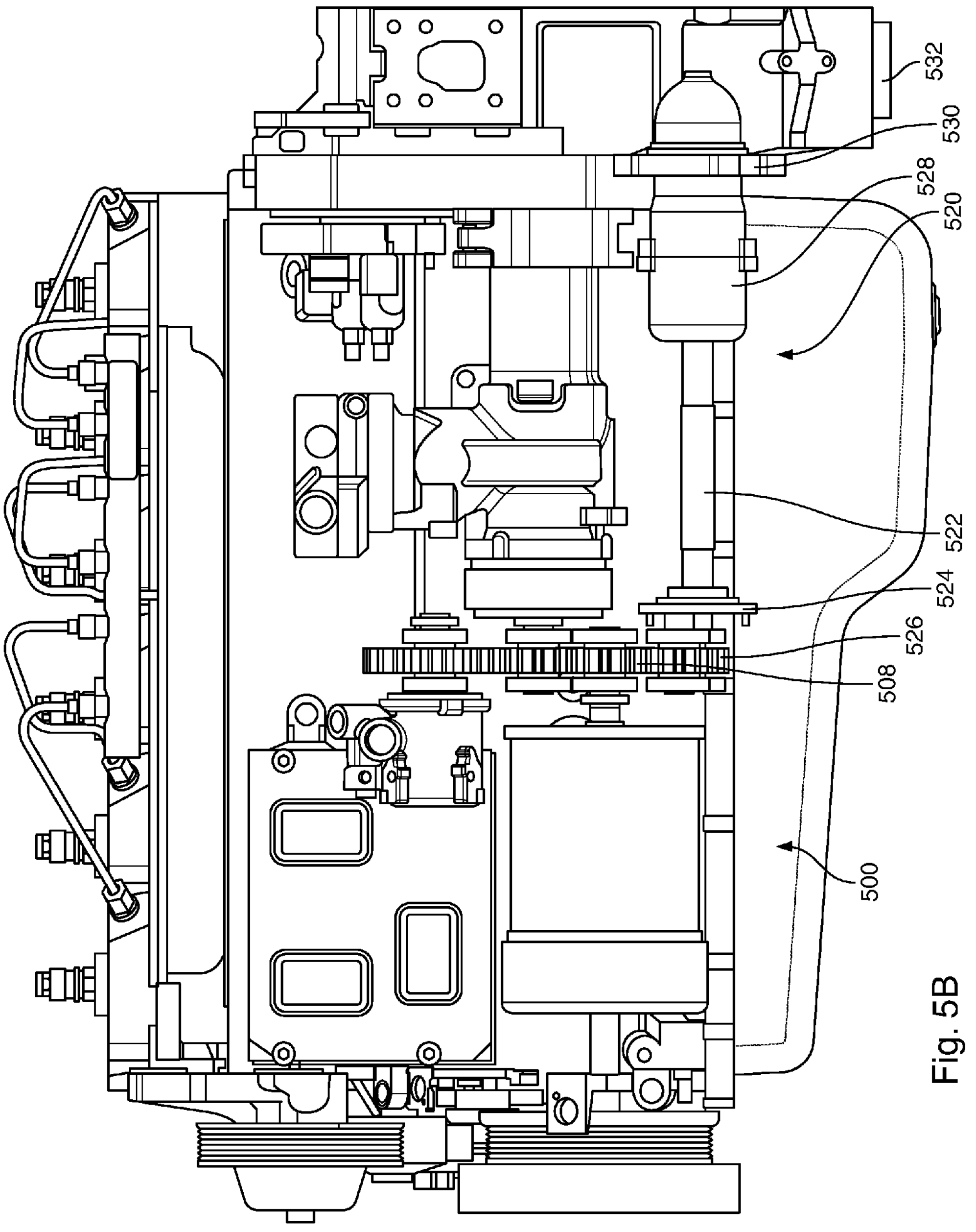

FIG. 5B illustrates the EAD system 500 of FIG. 5A, further including a starter assembly 520, according to an embodiment. The starter assembly 520 includes a starter shaft 522 and an engagement flange 524 by which the starter shaft 522 is operably coupled to a starter drive gear 526 of the first gear train 508. The starter shaft 522 extends into a starter housing 528. The starter housing 528 includes a mounting flange 530 by which the starter housing 528 is mounted to a flywheel housing 532 of the engine 502. As explained in further detail below, the starter housing 528 supports a pinion shaft and a sliding pinion gear. The sliding pinion gear is configured to engage the flywheel (not shown) to start the engine 502.

Figure 5C:
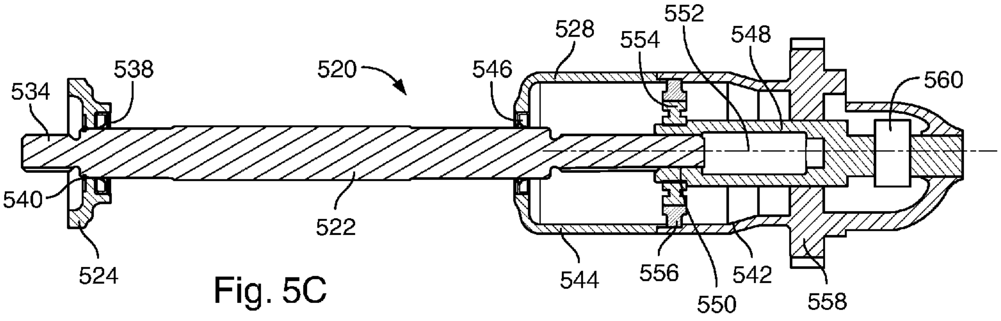
FIGS. 5C-5E illustrate the starter assembly of the EAD system of FIGS. 5A-5B.

FIG. 5C is a cross-sectional view of the starter assembly 520 of FIG. 5B. As illustrated in FIG. 5C, the starter shaft 522 has a first end 534 that extends into the engagement flange 524 and a second end 536 that extends into the starter housing 528. The first end 534 of the starter shaft 522 is operably coupled to the starter drive gear 526 (FIG. 5B). For example, in an embodiment, the first end 534 is splined and matches female splines on the starter drive gear 526. Because the starter shaft 522 engages the starter drive gear 526, the starter shaft 522 is driven by the MGU 504 via the first gear train 508. In some embodiments, the first end 534 is always engaged with the starter drive gear 526 during operation, such that the starter shaft 522 is free-spinning while the first gear train 508 is engaged. In other embodiments, however, the system 500 further includes an engagement mechanism (e.g., a clutch) to selectively engage the starter shaft 522 with the starter drive gear 526. A first fluid seal 538 fluidly seals the engagement flange 524 against the starter shaft 522. A retaining ring 540 operates to axially retain the starter shaft 522 relative to the engagement flange 524. In an embodiment, the engagement flange 524 is secured to a housing of the first gear train 508 by fasteners (e.g., two bolts).

Figure 5D:
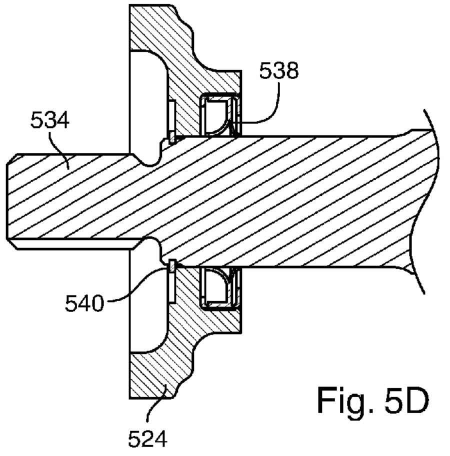

FIG. 5D is a detail cross-sectional view of the engagement flange 524 of FIG. 5C, further illustrating the first fluid seal 538 and the retaining ring 540. In an embodiment, the fluid seal 538 may include an oil seal, and the retaining ring 540 may include a snap ring. However, other embodiments may utilize other types of fluid seals 538 and/or retaining rings 540, or may not include the fluid seal 538 or the retaining ring 540.

Referring back to FIG. 5C, the starter housing 528 has a front housing portion 542 and a rear housing portion 544. The second end 536 of the starter shaft 522 extends into the rear housing portion 544. The rear housing portion 544 includes a fluid seal 546 to fluidly seal the starter housing 528 against the starter shaft 522. The second end 536 of the starter shaft 522 engages a pinion shaft 548 positioned substantially within the front housing portion 542.

Figure 5E:
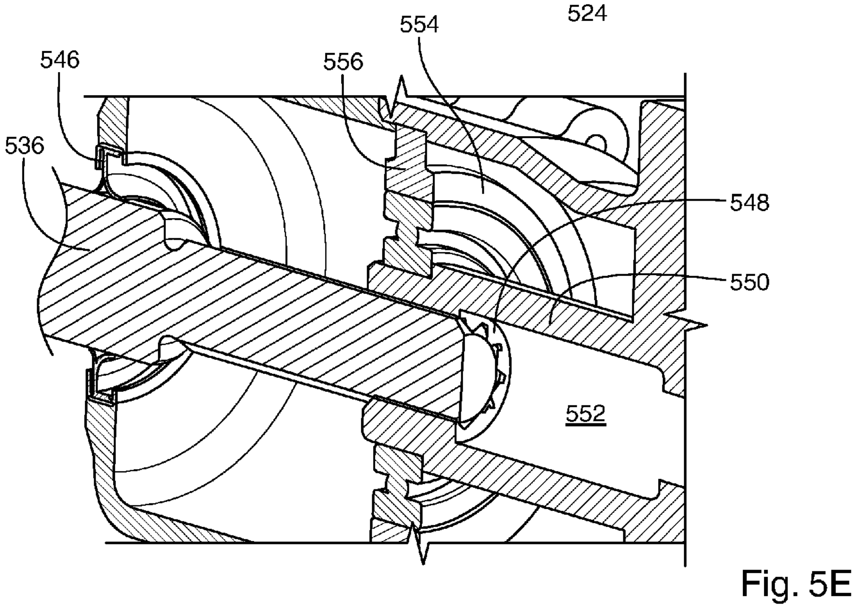

FIG. 5E is a perspective detail cross-sectional view of the interface between the starter shaft 522 and the starter housing 528 of FIG. 5C. As illustrated in FIGS. 3C and 3E, the second end 536 may include splines to engage a corresponding female splined portion 550 formed in the pinion shaft 548. The pinion shaft 548 has an internal cavity 552 forward of the female splined portion 550. During assembly with the engine 502, the second end 536 of the starter shaft 522 may be slid into the internal cavity 552 to facilitate assembly. The pinion shaft 548 is supported by a bearing 554. The bearing 554 may be press-fit onto a support 556 extending inward within the starter housing 528 proximate the interface between the front and rear housing portions 542, 544. Although not shown in FIG. 5C, the pinion shaft 548 may also be supported by a second bearing positioned at a second support 558 further within the front housing portion 542. A pinion gear 560 is coupled to the pinion shaft 548, and is configured to engage the ring gear of the flywheel (not shown) to start the engine 502. For the purposes of the present disclosure, details of the pinion gear 560 and the engagement mechanism are not shown. In one embodiment, the engagement mechanism includes a forked lever that is engaged (e.g., electrically, hydraulically, etc.) to slide the pinion gear 560 forward on the pinion shaft 548 to engage the pinion gear 560 with the ring gear of the flywheel.

In certain implementations, the systems or processes described herein can include a controller structured to perform certain operations described herein. In certain implementations, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain implementations, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIGS. 2-5E.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. It should be understood that features described in one embodiment could also be incorporated and/or combined with features from another embodiment in manner understood by those of ordinary skill in the art. It should also be noted that the terms "example" and "exemplary" as used herein to describe various embodiments are intended to indicate that such embodiments are possible examples, representations, and/or illustrations of possible embodiments (and such terms are not intended to connote that such embodiments are necessarily extraordinary or superlative examples).

What is claimed is:

1. An engine accessory drive (EAD) system for an internal combustion engine, the system comprising:

a motor-generator unit (MGU) configured to be operably coupled to an accessory;

a gearbox assembly including:

a first gear train operably coupled to the MGU, a second gear train operably coupled to an output of the engine, and a clutch selectively coupling the first gear train with a second gear train;

a starter assembly including:

a starter shaft operably coupled to the second gear train, a starter pinion coupled to the starter shaft, and an actuator configured to selectively engage the starter pinion with a flywheel of the engine; and an EAD controller configured to selectively operate the EAD system in one of a generator mode, an accessory drive mode, and a starter mode, wherein, in the starter mode, the clutch is disengaged, the actuator is configured to engage the starter pinion with the flywheel, and the MGU is configured to convert electrical energy to mechanical energy to drive the flywheel.

2. The system of claim 1, wherein, in the generator mode, the clutch is engaged to couple the first gear train with the second gear train so as to transfer mechanical energy from the output of the engine to the MGU, wherein the MGU is configured to convert the mechanical energy to electrical energy.

3. The system of claim 2, wherein, in the accessory drive mode, the clutch is disengaged and the MGU is configured to convert electrical energy to mechanical energy to drive the accessory.

4. The system of claim 1, wherein, in the accessory drive mode, the clutch is disengaged and the MGU is configured to convert electrical energy to mechanical energy to drive the accessory.

5. The system of claim 1, wherein the MGU includes only one input/output shaft to operably couple the MGU to each of the accessory and the gearbox assembly.

6. The system of claim 1, wherein the gearbox assembly has a first gear ratio of at least 10:1 to drive the flywheel, and a second gear ratio of at least 2.5:1 to drive the accessory.

7. The system of claim 1, wherein the gearbox assembly has a gear ratio of about 14.5:1 to drive the flywheel, and a second gear ratio of about 3:1 to drive the accessory.

8. The system of claim 1, wherein the EAD controller is configured to change operation of the EAD system from one of the generator mode, the accessory drive mode, and the starter mode to another of the generator mode, the accessory drive mode, and the starter mode without reducing an operating speed of the MGU to zero.

9. The system of claim 1, further comprising an engagement mechanism to selectively decouple the MGU from the first gear train.

10. The system of claim 1, wherein the EAD controller is configured to operate the EAD system in the accessory drive mode when the engine is shut off.

11. An engine accessory drive (EAD) system for an internal combustion engine, the system comprising:

a motor-generator unit (MGU) configured to be operably coupled to an accessory;

a gearbox assembly including:

a first gear train operably coupled to the MGU, a second gear train operably coupled to an output of the engine, and a clutch selectively coupling the first gear train with a second gear train;

a starter assembly including:

a starter shaft operably coupled to the second gear train, a starter pinion coupled to the starter shaft, and an actuator configured to selectively engage the starter pinion with a flywheel of the engine; and an EAD controller configured to selectively operate the EAD system in one of a generator mode, an accessory drive mode, and a starter mode;

an electrical sensor in operative communication with the EAD controller, the electrical sensor configured to measure a state of charge value of a battery system electrically coupled to the MGU, wherein the EAD controller is structured to:

interpret the state of charge value, change operation of the EAD system from the accessory drive mode to the starter mode when the state of charge value falls below a predetermined value, and change operation of the EAD system from the starter mode to the generator mode upon the engine starting.

12. The system of claim 11, further comprising:

a load sensor in operative communication with the EAD controller, the load sensor configured to measure an accessory load demand value, wherein the EAD controller is structured to:

interpret the accessory load demand value, determine an MGU output capacity based on the state of charge value, change operation of the EAD system from the accessory drive mode to the starter mode when the accessory load demand value exceeds the MGU output capacity, and change operation of the EAD system from the starter mode to the generator mode upon the engine starting.

13. An engine accessory drive (EAD) system for an internal combustion engine, the system comprising:

a motor-generator unit (MGU) configured to selectively operate as an electric generator and an electric motor, the MGU operably coupled to an energy storage system;

a gearbox assembly operably coupled to the MGU and to an output of the engine; and an EAD controller in operative communication with each of the MGU and the gearbox assembly, wherein the EAD controller is structured to:

receive engine data indicative of an engine condition, receive state of charge data indicative of a state of charge of the energy storage system, interpret each of the engine data and the state of charge data, and selectively operate the EAD system in one of a generator mode and an accessory drive mode based on the interpreted engine data and state of charge data, wherein the gearbox assembly is selectable between first and second gear ratios, the first gear ratio being at least four-times higher than the second gear ratio, and wherein the first gear ratio is selected when the EAD system is operational in the starter mode.

14. The system of claim 13, further comprising a starter assembly operably coupled to the gearbox assembly, wherein the EAD controller is further structured to selectively operate the EAD system in a starter mode.

15. The system of claim 13, wherein the first gear ratio is at least 10:1 and the second gear ratio is at least 2.5:1.

16. The system of claim 13, wherein the first gear ratio is about 14.5:1 and the second gear ratio is about 3:1.

17. The system of claim 13, wherein the second gear ratio is selected when the EAD system is operational in the accessory drive mode.

18. The system of claim 13, wherein the gearbox assembly includes an engagement mechanism to change the gear ratio of the gearbox assembly from one of the first and second gear ratios to the other of the first and second gear ratios without reducing an operating speed of the MGU to zero.

19. A method, comprising:

providing an engine accessory drive (EAD) controller operably coupled to each of an internal combustion engine and an EAD system, the EAD system including:

a motor-generator unit (MGU) configured to selectively operate as an electric generator and an electric motor, an energy storage system operably coupled to the MGU, a gearbox assembly operably coupled to the MGU and to an output of the engine; a clutch selectively coupling a first gear train with a second gear train: and a starter assembly operably coupled to the gearbox assembly, receiving, by the EAD controller, engine data indicative of an engine condition;

receiving, by the EAD controller, state of charge data indicative of a state of charge of the energy storage system;

interpreting, by the EAD controller, each of the engine data and the state of charge data; and selectively operating, by the EAD controller, the EAD system in one of a starter mode, a generator mode, and an accessory drive mode, wherein, in the starter mode, the clutch is disengaged, the actuator is configured to engage the starter pinion with the flywheel, and the MGU is configured to convert electrical energy to mechanical energy to drive the flywheel.

20. The method of claim 19, wherein, in the generator mode, the clutch is engaged to couple the first gear train with the second gear train so as to transfer mechanical energy from the output of the engine to the MGU, wherein the MGU is configured to convert the mechanical energy to electrical energy.

21. The method of claim 19, wherein, in the accessory drive mode, the clutch is disengaged and the MGU is configured to convert electrical energy to mechanical energy to drive the accessory.

22. The method of claim 19, further comprising selectively operating the gearbox assembly, by the EAD controller, in first and second gear ratios, the first gear ratio being at least four-times higher than the second gear ratio.

* * * * *